(12) United States Patent
Hamada

(10) Patent No.: US 12,316,814 B2
(45) Date of Patent: May 27, 2025

(54) MEDIUM DISCHARGE DEVICE AND IMAGE READING DEVICE

(71) Applicant: SEIKO EPSON CORPORATION, Tokyo (JP)

(72) Inventor: Yuhei Hamada, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 159 days.

(21) Appl. No.: 18/161,625

(22) Filed: Jan. 30, 2023

(65) Prior Publication Data

US 2023/0247155 A1 Aug. 3, 2023

(30) Foreign Application Priority Data

Jan. 31, 2022 (JP) .................................. 2022-012890

(51) Int. Cl.
*H04N 1/00* (2006.01)
*B65H 29/12* (2006.01)
*B65H 29/60* (2006.01)

(52) U.S. Cl.
CPC ....... *H04N 1/00631* (2013.01); *B65H 29/125* (2013.01); *H04N 1/00602* (2013.01); *B65H 29/60* (2013.01); *B65H 2301/3122* (2013.01); *B65H 2301/44318* (2013.01); *B65H 2404/1115* (2013.01); *B65H 2404/134* (2013.01); *B65H 2404/1345* (2013.01); *B65H 2404/143* (2013.01); *B65H 2404/144* (2013.01); *B65H 2404/161* (2013.01); *B65H 2801/39* (2013.01)

(58) Field of Classification Search
CPC ...... B65H 29/12; B65H 29/125; B65H 29/14; B65H 29/70; B65H 2301/3122; B65H 2301/44318; B65H 2402/51; B65H 2402/52; B65H 2404/1114; B65H 2404/1115; B65H 2404/134; B65H 2404/1341; B65H 2404/1345; B65H 2404/1413; B65H 2404/143; B65H 2404/144; B65H 2404/65; B65H 2404/651; B65H 2404/652; B65H 2404/653; B65H 2404/654; B65H 2801/39; H04N 1/00602
See application file for complete search history.

(56) References Cited

U.S. PATENT DOCUMENTS

| | | | | |
|---|---|---|---|---|
| 6,089,567 A | * | 7/2000 | Yatsuhashi | B65H 29/12 271/272 |
| 2003/0085976 A1 | * | 5/2003 | Youn | B41J 13/106 347/104 |

(Continued)

FOREIGN PATENT DOCUMENTS

JP 2007-197163 A 8/2007

*Primary Examiner* — Prasad V Gokhale
(74) *Attorney, Agent, or Firm* — WORKMAN NYDEGGER

(57) ABSTRACT

A medium discharge device includes a discharge driven roller that nips the medium between the discharge driven roller and a discharge drive roller and that rotates drivenly and a first discharge aid member and a second discharge aid member that have a larger diameter than the discharge driven roller and that rotate by torque from the discharge driven roller, wherein the second discharge aid member is positioned to the outside of the first discharge aid member in the width direction, and the torque from the discharge driven roller is transmitted to the second discharge aid member via a shaft and an universal joint.

10 Claims, 12 Drawing Sheets

(56) References Cited

U.S. PATENT DOCUMENTS

2012/0119431 A1* 5/2012 Kobayashi ............. B65H 85/00
271/3.19
2015/0048568 A1* 2/2015 Yoshikawa ............ B65H 29/14
271/314
2021/0331883 A1* 10/2021 Hayashi ............... B65H 3/0669

* cited by examiner

MEDIUM DISCHARGE DEVICE AND IMAGE READING DEVICE

The present application is based on, and claims priority from JP Application Serial Number 2022-012890, filed Jan. 31, 2022, the disclosure of which is hereby incorporated by reference herein in its entirety.

BACKGROUND

1. Technical Field

The present disclosure relates to a medium discharge device for discharging media and an image reading device equipped with the medium discharge device.

2. Related Art

As an example of an image reading device is a sheet-feed type scanner. Hereinafter, when referred to simply as a scanner, this refers to a sheet-feed type scanner. The scanner has a discharge tray on which the document that has been scanned is stacked, and a discharge device that discharges the document toward the discharge tray. The discharge device has a discharge roller, and the document is discharged by the discharge roller. The discharge device may also be provided with a projection adjacent to the discharge roller to kick out the trailing end of the document, as shown in JP-A-2007-197163. Hereinafter, such a projection will be referred to as a discharge aid section. The provision of the discharge aid section prevents the trailing end of the document from remaining on the discharge roller.

The discharge aid sections described in the JP-A-2007-197163 are provided on both sides of a discharge roller at the center position of the document, and cannot give a kick-out effect at the side edges of the trailing end of the document. The side edges of the trailing end of the documents are particularly prone to curling, and the discharge aid section near the center of the document alone cannot properly kick-out the trailing end of the document. Therefore, in order to give the kick-out effect at the side edges of the trailing end of the document, the discharge aid sections must be further installed at the side edges positions.

However, in order to rotate the discharge aid section provided at the side edges positions, it is necessary to extend the shaft from the discharge roller and transmit torque from the discharge roller to the discharge aid section. If the discharge roller is displaceable according to document thickness, the discharge aid section will also be displaced with displacement of the discharge roller, and it will not be possible to properly give a kick-out effect to the side edges of the curled document trailing end.

SUMMARY

In order to solve the above problem, a medium discharge device of the present disclosure includes a discharge drive roller that contacts a first surface of a medium to be discharged and that rotates by power from a drive source; a discharge driven roller that contacts a second surface opposite from the first surface of the medium to be discharged and that is drivenly rotated with the medium nipped between itself and the discharge drive roller; a first discharge aid member that contacts the second surface of the medium to be discharged, that has a larger diameter than the discharge driven roller, and that rotates by torque from the discharge driven roller; and a second discharge aid member that contacts the second surface of the medium to be discharged, that has a larger diameter than the discharge driven roller, and that rotates by torque from the discharge driven roller, wherein the second discharge aid member is positioned to the outside of the first discharge aid member in a width direction that intersects a medium discharge direction, the discharge driven roller and the first discharge aid member are displaceable in directions toward and away from the discharge drive roller, and torque of the discharge driven roller is transmitted to the second discharge aid member via a shaft and a universal joint.

Further, an image reading device of the present disclosure includes the medium discharge device; and a reading section that is located upstream from the medium discharge device in a medium transport path and that reads the medium.

DESCRIPTION OF EMBODIMENTS

Figure 1:
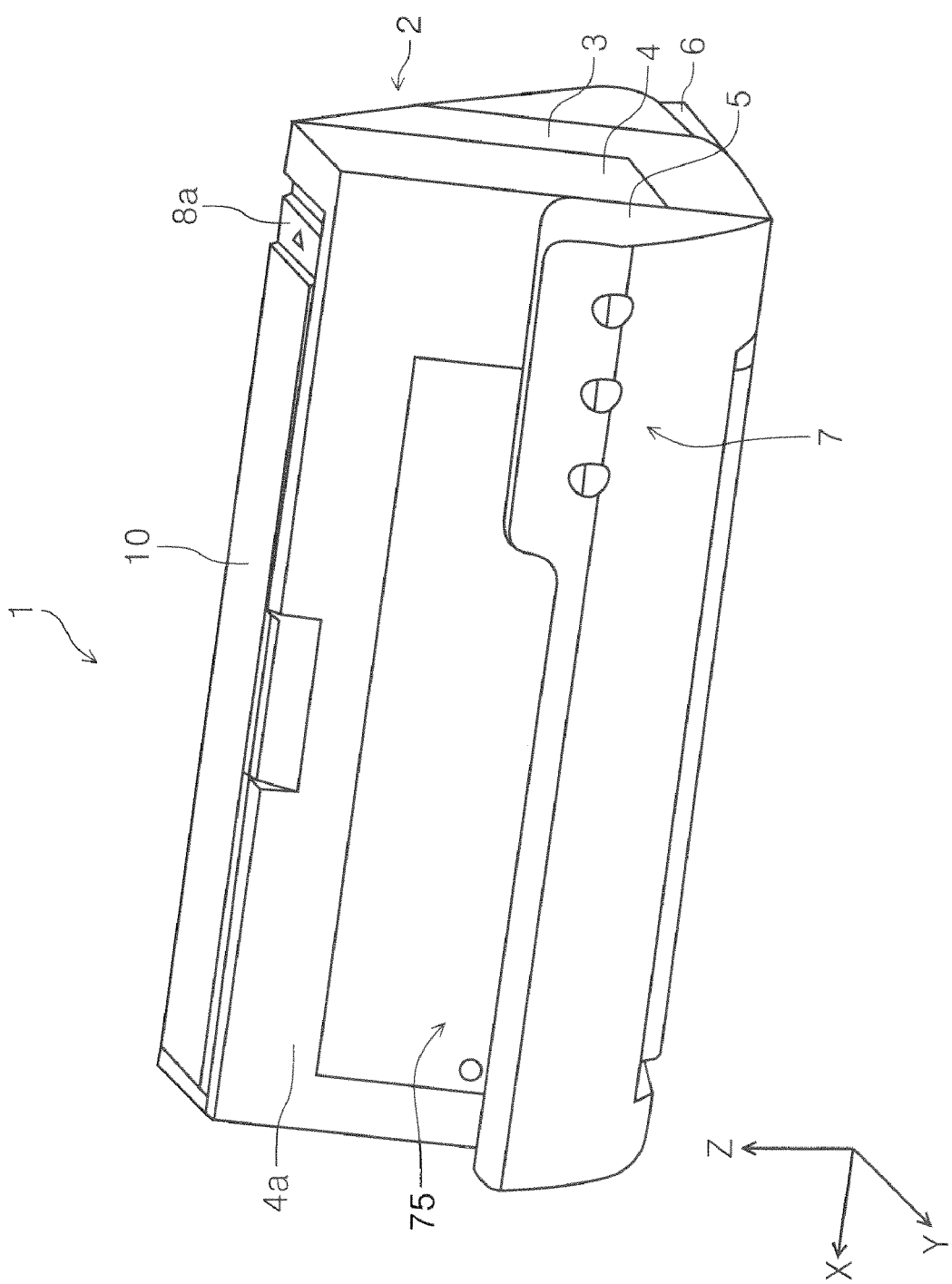
FIG. 1 is a front perspective view of a scanner in which a device main body is in a normal reading orientation.

The following is a schematic description of this disclosure. A medium discharge device according to a first aspect includes, a discharge drive roller that contacts a first surface of a medium to be discharged and that rotates by power from a drive source; a discharge driven roller that contacts a second surface opposite from the first surface of the medium to be discharged and that is drivenly rotated with the medium nipped between itself and the discharge drive roller; a first discharge aid member that contacts the second surface of the medium to be discharged, that has a larger diameter than the discharge driven roller, and that rotates by torque from the discharge driven roller; and a second discharge aid member that contacts the second surface of the medium to be discharged, that has a larger diameter than the discharge driven roller, and that rotates by torque from the discharge driven roller, wherein the second discharge aid member is positioned to the outside of the first discharge aid member in a width direction that intersects a medium discharge direction, the discharge driven roller and the first discharge aid member are displaceable in directions toward and away from the discharge drive roller, and torque of the discharge driven roller is transmitted to the second discharge aid member via a shaft and a universal joint.

According to this aspect, the second discharge aid member is provided outside of the first discharge aid member in the width direction, so that a kick-out effect can be given to the side edges of the trailing end of the medium or their vicinities. The torque of the discharge driven roller is transmitted to the second discharge aid member via the shaft and the universal joint, so that the second discharge aid member can easily maintain the position with respect to the medium even if the discharge driven roller is displaced, and a kick-out effect can be given to the side edges of the trailing end of the medium or their vicinities. In this disclosure, the side edges of the trailing end of medium means side edges of the trailing end of medium in the width direction, and to the outside in the width direction means the direction from the center position of the medium in the width direction to the side edge. In the present disclosure, the first discharge aid member or the second discharge aid member has a larger diameter than the discharge driven roller means that the maximum diameter of the first discharge aid member or the second discharge aid member is larger than the maximum diameter of the discharge driven roller. Therefore, the first discharge aid member and the second discharge aid member are not limited to a form in which the diameter is uniform in the circumferential direction.

A second aspect is the first aspect, wherein a rotation shaft of the second discharge aid member is supported by a bearing section positioned to the outside of the second discharge aid member in the width direction.

According to this aspect, the second discharge aid member can properly maintain its position relative to the medium when the discharge driven roller is displaced, because it is axially supported by the bearing section located to the outside of the second discharge aid member in the width direction.

A third aspect is the second aspect, wherein two universal joints are provided between the discharge driven roller and the second discharge aid member.

According to this aspect, two universal joints are provided between the discharge driven roller and the second discharge aid member, so that the second discharge aid member can easily maintain its orientation in addition to its position relative to the medium when the discharge driven roller is displaced.

A fourth aspect is any of the first to third aspects, further including a discharge tray that supports a discharged medium in an inclined orientation, wherein the discharge drive roller and the discharge driven roller are located at a bottom portion of the discharge tray and discharge the medium diagonally upward with the second surface of the medium downward.

In the configuration in which the discharge drive roller and the discharge driven roller are located at the bottom portion of the discharge tray that supports the medium in the inclined orientation and the medium is discharged diagonally upward with the second surface of the medium downward, it is difficult to kick out the trailing end of the medium from the discharge driven roller, especially if the side edge of the trailing end of the medium is curled. However, the effects of the first to third aspects described above allow the side edges of the trailing end of the medium or their vicinities to be kicked out appropriately.

A fifth aspect is the medium discharge device according to the fourth aspect, including a restricting section that restricts displacement of the discharge driven roller in directions advancing toward and retreating from the discharge tray.

If the first discharge aid member, which is displaced together with the discharge driven roller, contacts the medium supported on the discharge tray, the stacked medium on the discharge tray may be disturbed. However, according to this aspect, the restricting section that regulates the displacement of the discharge driven roller in the direction in which the discharge driven roller advances to the discharge tray, so that first discharge aid member can be prevented from contacting the medium supported by the discharge tray, and medium on the discharged tray can be properly maintain the stacked state.

A sixth aspect is any one of the first to fifth aspects, wherein the first discharge aid member and the second discharge aid member are configured by an elastic member having a cylindrical shape.

According to this aspect, since the first discharge aid member and the second discharge aid member are configured by an elastic member having a cylindrical shape, the kick-out effect can be appropriately given to the trailing end of the medium.

A seventh aspect is any one of the first to fifth aspects, wherein the first discharge aid member has a plurality of first protrusions in a circumferential direction and the second discharge aid member has a plurality of second protrusions in a circumferential direction.

According to this aspect, the first discharge aid member has a plurality of first protrusions in the circumferential direction, and the second discharge aid member has a plurality of second protrusions in the circumferential direction, so that kick-out effect can be appropriately given to the trailing end of the medium.

An eighth aspect is any one of the first to seventh aspects, wherein the first discharge aid member and the second discharge aid member are arranged at positions that have line symmetry with respect to a center line that passes through a center position of the medium in the width direction and that extends along the medium discharge direction.

According to this aspect, the first discharge aid member and the second discharge aid member are arranged at positions that have line symmetry with respect to the center line, so that a kick-out force can be applied evenly to the trailing end of the medium along the width direction.

A ninth aspect is any one of the first to eighth aspects, further including a transport drive roller and a transport driven roller that are located upstream of the discharge drive roller and the discharge driven roller and that transport the medium toward the discharge drive roller and the discharge driven roller, wherein the transport driven roller is displaceable toward the transport drive roller, and the discharge driven roller and the transport driven roller are pressed against opposing rollers by a double torsion spring.

According to this aspect, since the discharge driven roller and the transport driven roller are pressed against the opposing rollers by the double torsion spring, it is possible to reduce the number of parts and the number of assembly steps.

An image reading device according to a tenth aspect includes the medium discharge device according to any of the first to ninth aspects and a reading section that is located upstream of the medium discharge device in the transport path of the medium and that reads the medium.

According to this aspect, the effects of any of the first to ninth aspects described above can be obtained by the image reading device.

Hereinafter, the present disclosure will be specifically described. Hereinafter, a scanner 1 that can read at least one of a first surface of a document and a second surface opposite from the first surface will be described as an example of an image reading device. The scanner 1 is a so-called sheet-feed type scanner that performs scanning while moving a document, which is an example of a medium, to a reading section to be explained later. In this disclosure, a document includes not only a sheet-like document but also a card-like document and a booklet-like document.

In the X-Y-Z coordinate system shown in each drawing, the X-axis direction is the width direction of the device and also the document width direction. The Y-axis direction is the device depth direction, and the Z-axis direction is a direction along the vertical direction. In this embodiment, the +Y direction is from the back of the device to the front, and the −Y direction is from the front of the device to the back. Further, a left direction is the +X direction and the right direction is the −X direction as viewed from the front of the device. Hereinafter, a direction in which a document is transported may be referred to as "downstream", and the opposite direction as "upstream". In describing the different embodiments in the following descriptions, the same symbols will be used for identical configurations, and duplicate descriptions will be avoided.

In FIG. 1, the scanner 1 has device main body 2 and a main body support section 6 that rotatably supports the device main body 2. The device main body 2 consists of a first unit 3, a second unit 4, and a third unit 5.

The second unit 4 and the third unit 5 can rotate together relative to the first unit 3 around a rotation shaft (not shown). Symbol 8a indicates an unlocking section. The user can unlock the second unit 4 and the third unit 5 with respect to the first unit 3 by sliding the unlocking section 8a in the −X direction. Then, by rotating the second unit 4 and the third unit 5 relative to the first unit 3, a document feed path R1 and a reading transport path R2 (to be described later) can be exposed. The third unit 5 can rotate around a rotation axis (not shown) relative to the first unit 3 and the second unit 4. By rotating the third unit 5 relative to the first unit 3 and the second unit 4, a reverse transport path R3 (to be described later) can be exposed.

Figure 2:
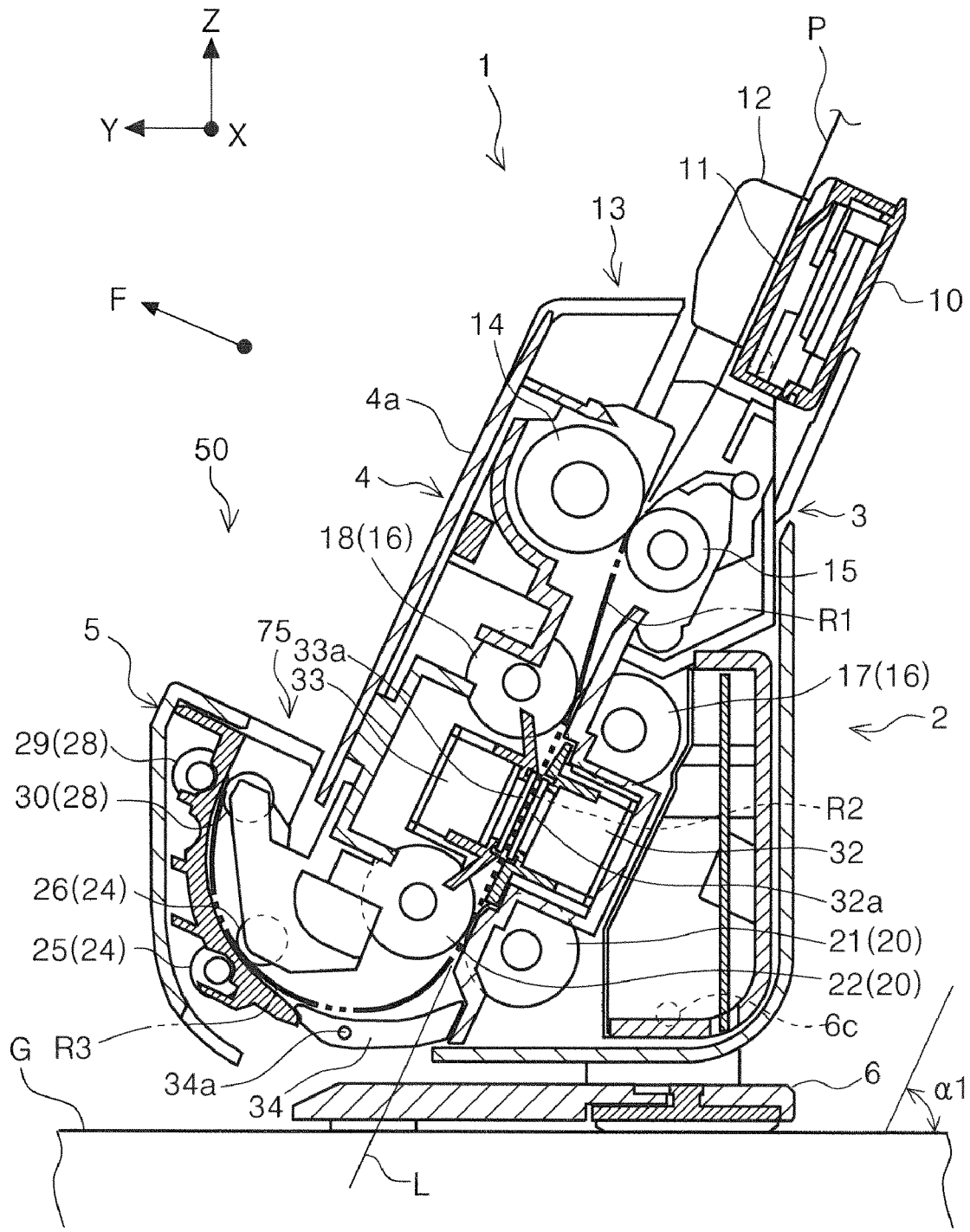
FIG. 2 is a cross-sectional view of a document transport path of a scanner in which the device main body is in a normal reading orientation as viewed from a width direction.
Figure 3:
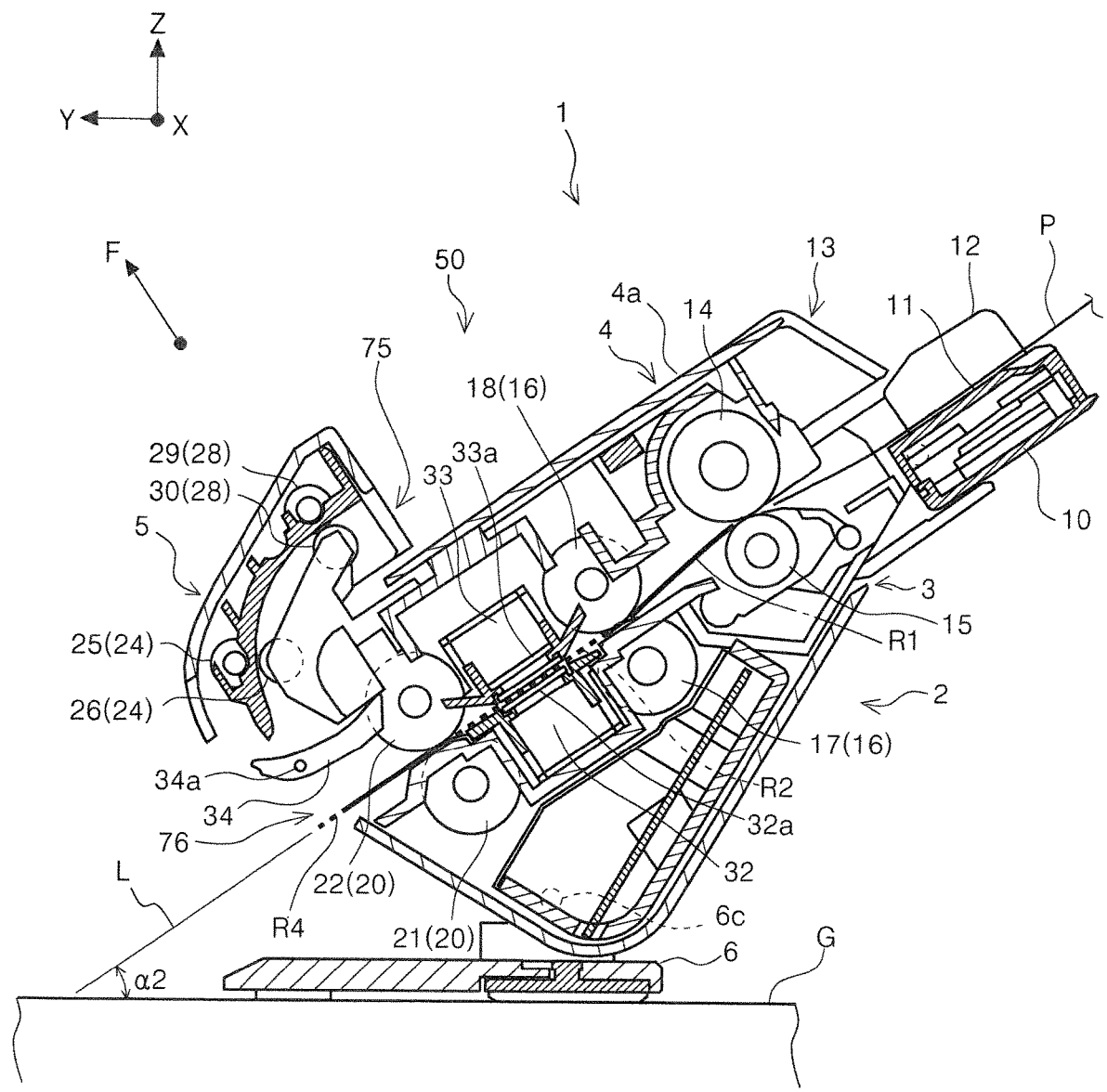
FIG. 3 is a cross-sectional view of the document transport path of the scanner when the device main body is in the booklet reading orientation as viewed from the width direction.

The device main body 2 can rotate around the main body rotation axis 6c (see FIGS. 2 and 3) with respect to the main body support section 6. In this embodiment, the device main body 2 can hold two orientations by rotating. The two orientations of the device main body 2 are shown in FIGS. 2 and 3, and hereinafter, the orientation in FIG. 2 is will be referred to as a normal reading orientation and the position in FIG. 3 as a booklet reading orientation. The first orientation of the device main body 2 is the orientation in which the reading transport path R2 is connected to the reverse transport path R3. The second position of the device main body 2 is the orientation in which the reading transport path R2 is connected to a non-reverse transport path R4.

In this embodiment, orientation switching of the device main body 2 is performed by the user applying an external force to the device main body 2. The normal reading orientation and the booklet reading orientation of the device main body 2 are each maintained by a snap-fit section (not shown). It is also suitable to provide a handle portion in the device main body 2 to improve operability of the orientation switching by the user. Instead of the configuration in which the user exerts an external force on the device main body 2 to change its orientation, the device main body 2 may be rotated by a motor or other power source to change its orientation.

An angle α1 shown in FIG. 2 and an angle α2 shown in FIG. 3 are angles formed by the reading transport path R2 and a device placement surface G, respectively, as will be described later. The angle α2 in the booklet reading orientation is smaller than the angle α1 in the normal reading orientation. The projected area of the device main body 2 on the placement surface G on which the scanner 1 is placed is smallest in the normal reading orientation, that is, the footprint of the device main body 2 is the smallest in the normal reading orientation. Note that the footprint in this disclosure is an area occupied by the device main body 2 in the X-Y plane as the device main body 2 is viewed from above. The normal reading orientation is suitable for reading a sheet-like document, that is, documents that have low rigidity and tend to flex. The booklet reading orientation is suitable for reading highly rigid and hard-to-bend documents such as a plastic cards or booklets.

As shown in FIGS. 2 and 3, the inclination angle of the document support section 11 with respect to the placement surface G is smaller in the booklet reading orientation than in the normal reading orientation. Similarly, the inclination angle of the reading transport path R2 with respect to the placement surface G is smaller in the booklet reading orientation than in the normal reading orientation, as shown in FIGS. 2 and 3. Similarly, an inclination angle between a straight line, which connects a document nip position at a first transport roller pair 16 (to be described later) and a document nip position at a second transport roller pair 20 (to be described later), and the placement surface G is, as shown in FIGS. 2 and 3, smaller in the booklet reading orientation than in the normal reading orientation.

On the front surface of the device, there is an operation section 7 consisting of a number of operation buttons, including a power button. In addition, a first discharge port 75 is formed on the front surface of the device where the document is discharged via the reverse transport path R3 (to be described later). Symbol 4a is a discharge tray that supports in an inclined orientation the document discharged from the first discharge port 75. The discharge tray 4a constitutes the +Y direction face of the second unit 4.

Next, a configuration of a document transport path in the scanner 1 will be described with reference to FIGS. 2 and 3. The fed document is supported in an inclined orientation by the document support section 11. Symbol P indicates the document to be supported. When multiple documents are supported on the document support section 11, the topmost document is fed downstream by the feed roller 14. The document support section 11 is constituted at the upper open/close section 10. The upper open/close section 10 can rotate around a rotation axis (not shown) and opens and closes the feed port 13 as it rotates. FIG. 1 shows a state in which the upper open/close section 10 is closed, and FIGS. 2 and 3 show a state in which the upper open/close section 10 is opened. The upper open/close section 10 constitutes the first unit 3.

The document support section 11 has a pair of edge guides 12 that guide the side edges of the document. The pair of edge guides 12 are slidable in the document width direction (X-axis direction). The pair of edge guides 12 are provided to move apart from each other or toward each other sandwiching the document width direction center position, and are linked by a rack and pinion mechanism (not shown). In other words, the scanner 1 employs a so-called center feeding system.

The feed roller 14 is provided in the second unit 4. The feed roller 14 rotates by power from a motor (not shown). A separation roller 15 is provided in the first unit 3 at a position opposed to the feed roller 14. The separation roller 15 is given rotational torque by a torque limiter (not shown) to suppress double feeding of documents. The feed roller 14 and the separation roller 15 are located at the central position in the document width direction. In addition, a separation pad may be provided instead of the separation roller 15. Further, in the present embodiment, the feed roller 14 is installed at the upper side of the document placed on the document support section 11 and the document is fed from the topmost document. However, the feeding roller 14 may be installed at bottom side of the document placed on the document support section 11 and the document may be fed from the bottommost document.

A first transport roller pair 16 is provided downstream of the feed roller 14 and the separation roller 15. The first transport roller pair 16 consists of a first lower roller 17 provided in the first unit 3 and a first upper roller 18 provided in the second unit 4. The first upper roller 18 is movable toward and away from the first lower roller 17 and is pressed toward the first lower roller 17 by a pressing member (not shown), for example, a coil spring. Both the first lower roller 17 and the first upper roller 18 rotate by power from a motor (not shown). Two first lower rollers 17 are provided so as to sandwich the center position in the document width direction and two first upper rollers 18 are provided so as to sandwich the center position in the document width direction. When the second unit 4 is closed against the first unit 3, the first lower roller 17 and the first upper roller 18 come into contact. When the second unit 4 is opened against the first unit 3, the first upper roller 18 is separated from the first lower roller 17.

A first reading section 32 and a second reading section 33 are positioned opposite each other downstream of the first transport roller pair 16. The first reading section 32 is provided in the first unit 3, and the second reading section 33 is provided in the second unit 4. The first reading section 32 reads the bottom surface (first surface) of the document supported by the document support section 11, and the second reading section 33 reads the top surface (second surface) of the document supported by the document support section 11. The second reading section 33 is movable toward and away from the first reading section 32, and is pressed toward the first reading section 32 by a pressing member (not shown), for example, a coil spring. In this embodiment, the first and the second reading sections 32 and 33 consist of a contact image sensor module (CISM). Symbol 32a is a contact glass that constitutes the first reading section 32, and symbol 33a is a contact glass that constitutes the second reading section 33.

The second transport roller pair 20 is provided downstream of the first reading section 32 and the second reading section 33. The second transport roller pair 20 is configured from a second lower roller 21 provided in the first unit 3 and a second upper roller 22 provided in the second unit 4. The second upper roller 22 is movable toward and away from the second lower roller 21, and is pressed toward the second lower roller 21 by a pressing member (not shown), for example, a coil spring. Both the second lower roller 21 and the second upper roller 22 rotate by power from a motor (not shown). Two second lower rollers 21 are provided so as to sandwich the center position in the document width direction and two second upper rollers 22 are provided so as to sandwich the center position in the document width direction. When the second unit 4 is closed against the first unit 3, the second lower roller 21 and the second upper roller 22 come into contact. When the second unit 4 is opened up with respect to the first unit 3, the second upper roller 22 is separated from the second lower roller 21.

A one-dot chain line indicated by the symbol R1 is the document feed path. The document feed path R1 is from the nip position between the feed roller 14 and the separation roller 15 to the nip position between the first transport roller pair 16. A broken line indicated by the symbol R2 indicates a reading transport path. The reading transport path R2 is from the nip position of the first transport roller pair 16 to the nip position of the second transport roller pair 20. The reading transport path R2 is a document transport path facing the first reading section 32 and the second reading section 33, and is an example of a first transport path.

When the device main body 2 is in the normal reading orientation shown in FIG. 2, the reverse transport path R3 is formed downstream of the reading transport path R2, which inverts the scanned document upward and discharges it. The reverse transport path R3 is a document transport path from the nip position of the second transport roller pair 20 to the nip position of the fourth transport roller pair 28. As shown by the two dot chain line in FIG. 2, the reverse transport path R3 inverts a document that is transported diagonally downward, curves it upward, and discharges it diagonally upward from the first discharge port 75. In this embodiment, the entire reverse transport path R3 is configured as an inverting path that inverts the document being transported upward. However, it can also further include a linear transport path, for example, and the inverting path that inverts the document upward can be a part of the reverse transport path R3.

When the device main body 2 is in the booklet reading orientation shown in FIG. 3, a non-reverse transport path R4 is formed downstream of the reading transport path R2 to discharge the scanned document without inverting it. The non-reverse transport path R4 is a document transport path downstream from the nip position of the second transport roller pair 20. As shown in FIG. 3 by two-dot chain line, a document that is transported diagonally downward from the reading transport path R2 is not inverted and curved but is discharged diagonally downward from the second discharge port 76. The second transport roller pair 20 functions as a discharge roller pair that discharges the document from the non-reverse transport path R4.

The outer side of the reverse transport path R3 is formed by a rotatable flap 34. The flap 34 switches its orientation by rotating around a flap rotation axis 34a. When the device main body 2 is in the normal reading orientation, the flap 34 is in a first transport path connection orientation (FIG. 2), which connects the reverse transport path R3 to the reading transport path R2. When the device main body 2 is in the booklet reading orientation, the flap 34 is in the second transport path connection orientation (FIG. 3), which connects the non-reverse transport path R4 to the reading transport path R2. Orientation switching of the flap 34 is performed by a solenoid (not shown). However, the user may apply an external force to the flap 34 to switch its orientation.

A third transport roller pair 24 and a fourth transport roller pair 28 are provided on the reverse transport path R3. The third transport roller pair 24 consists of a third driving roller 25 provided in the third unit 5 and a third driven roller 26 provided in the second unit 4. The third driven roller 26 is movable toward and away from the third drive roller 25, and is pressed toward the third drive roller 25 by a double torsion spring 55 (to be described later). The third drive roller 25 is driven by a motor (not shown). The third driven roller 26 is a roller driven to rotate.

The fourth transport roller pair 28 is configured from a fourth drive roller 29 provided in the third unit 5 and a fourth driven roller 30 provided in the second unit 4. The fourth driven roller 30 is movable toward and away from the fourth drive roller 29, and is pressed toward the fourth drive roller 29 by the double torsion spring 55 (to be described later). The fourth drive roller 29 is driven by a motor (not shown). The fourth driven roller 30 is a roller driven to rotate. The fourth drive roller 29 is an example of a discharge drive roller, and the fourth driven roller 30 is an example of a discharge driven roller. The third drive roller 25 is an example of a transport drive roller provided upstream of the fourth transport roller pair 28, and the third driven roller 26 is an example of a transport driven roller provided upstream of the fourth transport roller pair 28. Two fourth drive rollers 29 are provided so as to sandwich the center position in the document width direction and two fourth driven rollers 30 are provided so as to sandwich the center position in the document width direction.

Figure 4:
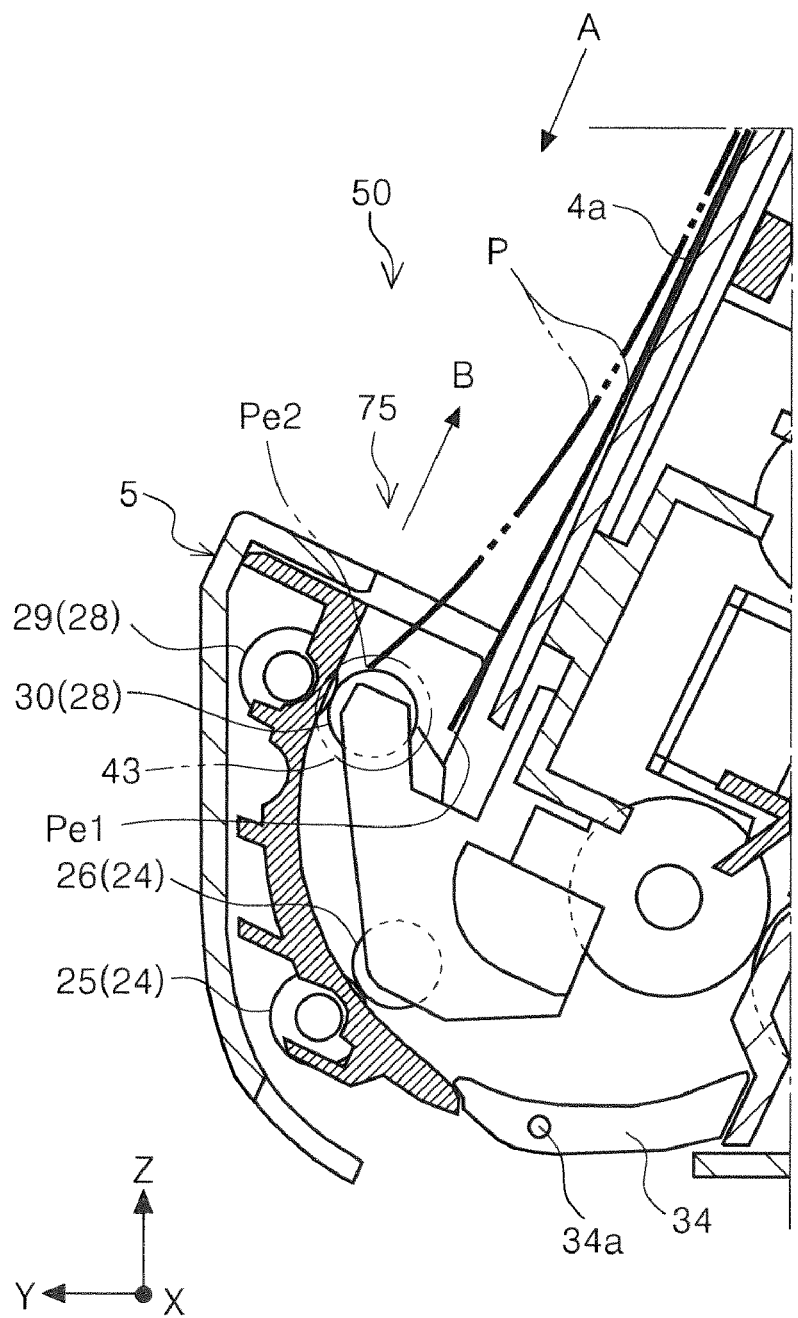
FIG. 4 is a side sectional view of a medium discharge device as viewed in the width direction.

Next, the medium discharge device 50 will be described. In FIG. 4, the medium discharge device 50 includes the fourth drive roller 29 that contacts the first surface of the document to be discharged, and the fourth driven roller 30 that contacts the second surface of the document to be discharged, which is opposite from the first surface. The fourth drive roller 29 and the fourth driven roller 30 are located at the bottom portion of the discharge tray 4a and discharge the document diagonally upward (arrow B direction) with the second surface of the document facing downward. The medium discharge device 50 also includes the discharge tray 4a.

Here, a problem in discharging the document will be explained. Symbol P indicates the document to be discharged. The solid line shows an orientation of the document at a center position in the width direction, and a two dot chain line shows an orientation of the document at side edge positions in the width direction. Further, symbol Pe1 indicates the trailing end of the document at a center position in the width direction, and symbol Pe2 indicates the trailing end of the document at side edge positions in the width direction. Symbol 43 is a first discharge aid member that gives a kick-out effect (an effect of kicking out the trailing end of the document in the direction of arrow B) to the near the center position of the trailing end of the document in the width direction. The first discharge aid member 43 is provided integrally with the fourth driven roller 30 and rotates together with the fourth driven roller 30. Two first discharge aid members 43 are provided so as to sandwich the center position in the document width direction.

The first discharge aid member 43 provides a kick-out effect to the trailing end of the document Pe1, so that the trailing end of the document Pe1 is less likely to stay on the fourth driven roller 30. However, if only the first discharge aid member 43 is provided, it is not possible to give the kick-out effect to the trailing end of the document Pe2, and the trailing end of the document Pe2 is will tend to stay on the fourth driven roller 30, as shown in FIG. 4. If the next document is discharged in this state, the stacked state of the documents on the discharge tray 4a will be disturbed. Such a problem is especially likely to occur if the trailing end of the document Pe2 is curled.

Figure 5:
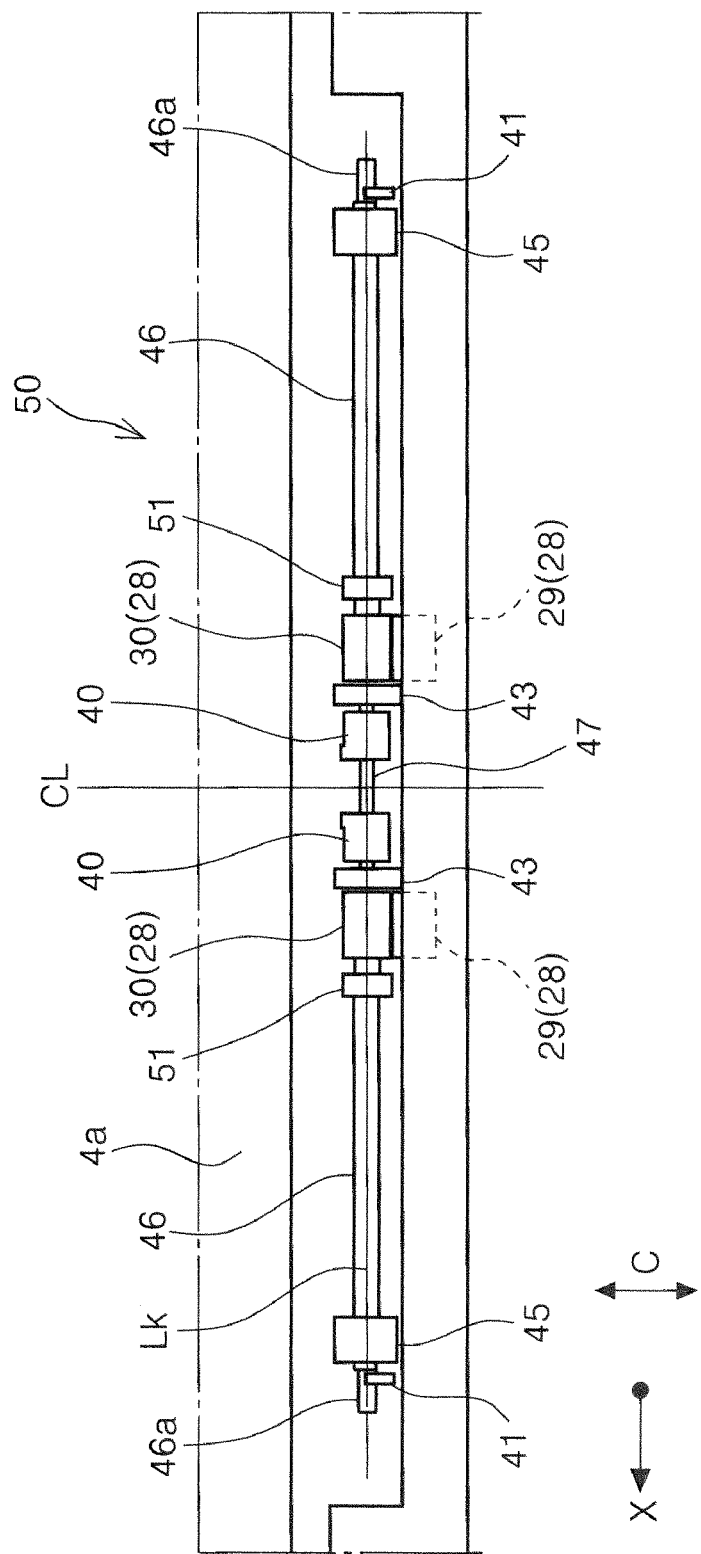
FIG. 5 is a view seen from the direction of the arrow A in FIG. 4.
Figure 6:
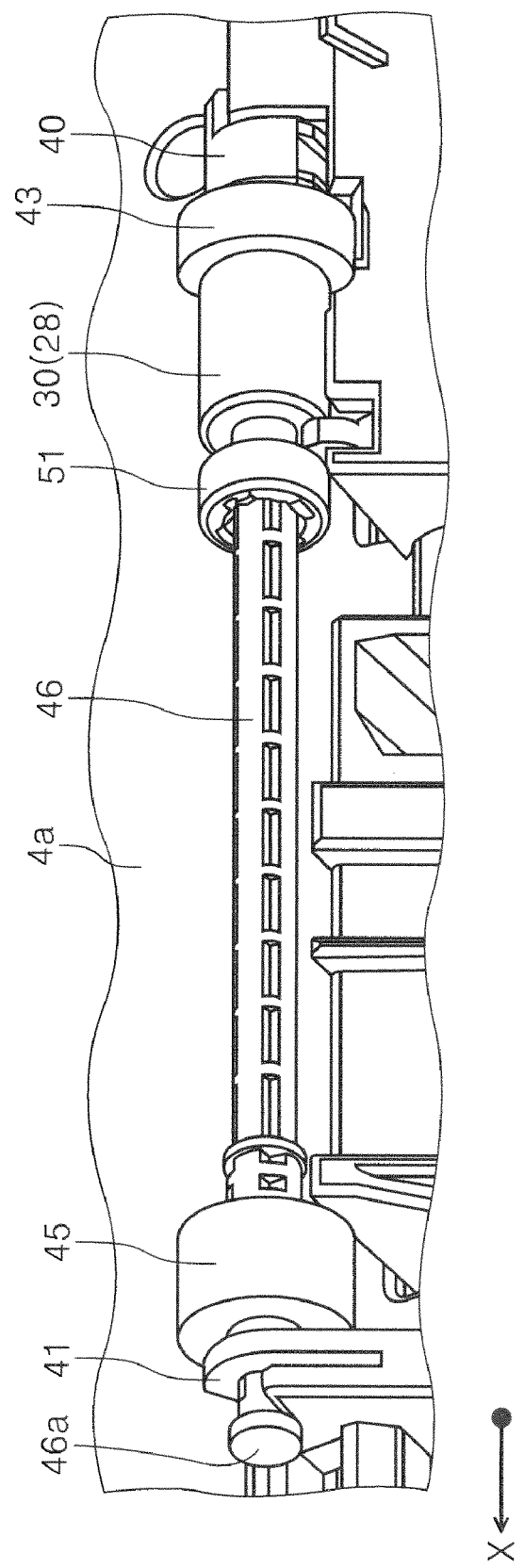
FIG. 6 is a perspective view of the medium discharge device.

The medium discharge device 50 in this embodiment has the following configuration in consideration of the above issues. In FIGS. 5 and 6, the medium discharge device 50 includes the first discharge aid member 43, which contacts the second surface of the discharged document, has a larger diameter than the fourth driven roller 30, and rotates with torque from the fourth driven roller 30, and a second discharge aid member 45, which contacts the second surface of the discharged medium, has a larger diameter than the fourth driven roller 30, and rotates with torque from the fourth driven roller 30.

The second discharge aid member 45 is positioned to the outside of the first discharge aid member 43 in the width direction (X-axis direction), which intersects the medium discharge direction (B direction in FIG. 4). The fourth driven roller 30 and the first discharge aid member 43 are displaceable toward and away from the forth drive roller 29 (direction C in FIG. 5), and torque of the fourth driven roller 30 is transmitted to the second discharge aid member 45 via a shaft 46 and a first universal joint 51. Two second discharge aid members 45 are provided so as to sandwich the center position in the document width direction.

This allows the second discharge aid member 45 to give a kick-out effect to the side edges of the trailing end of the document or their vicinities. Since the power of the fourth driven roller 30 is transmitted to the second discharge aid member 45 via the shaft 46 and the first universal joint 51, even if the fourth driven roller 30 is displaced, the second discharge aid member 45 can easily maintain its position (C direction position) with respect to the document, and the kick-out effect can be given to the side edges of the trailing end of the document or their vicinities without being affected by displacement of the fourth driven roller 30.

Further explanation will be given below. In this embodiment, the first discharge aid member 43 and the second discharge aid member 45 are configured by elastic members that form a cylindrical shape, and could be sponges, as an example. However, the elastic member is not limited thereto, and other elastic members may be used. Such an elastic member can provide an appropriate kick-out effect to the trailing end of the document.

In FIG. 5, the line indicated by symbol CL is a line passing through the center position of the document in the width direction, that is, the center line along the document discharge direction. The fourth drive rollers 29, the fourth driven rollers 30, the first discharge aid members 43, the second discharge aid members 45, first universal joints 51 (to be described later), shafts 46, first bearing sections 40, and second bearing sections 41 are arranged with line symmetry with respect to the center line CL. This allows the kick-out force to be applied evenly to the trailing end of the document along the width direction.

In this embodiment, the width of the second discharge aid member 45 in the X-axis direction is larger than that of the first discharge aid member 43, so that the kick-out effect can be appropriately given to the side edges of the trailing end of the document or their vicinities. However, the width of the second discharge aid member 45 may be the same as the width of the first discharge aid member 43, or the width of the second discharge aid member 45 may be smaller than that of the first discharge aid member 43.

Figure 7:
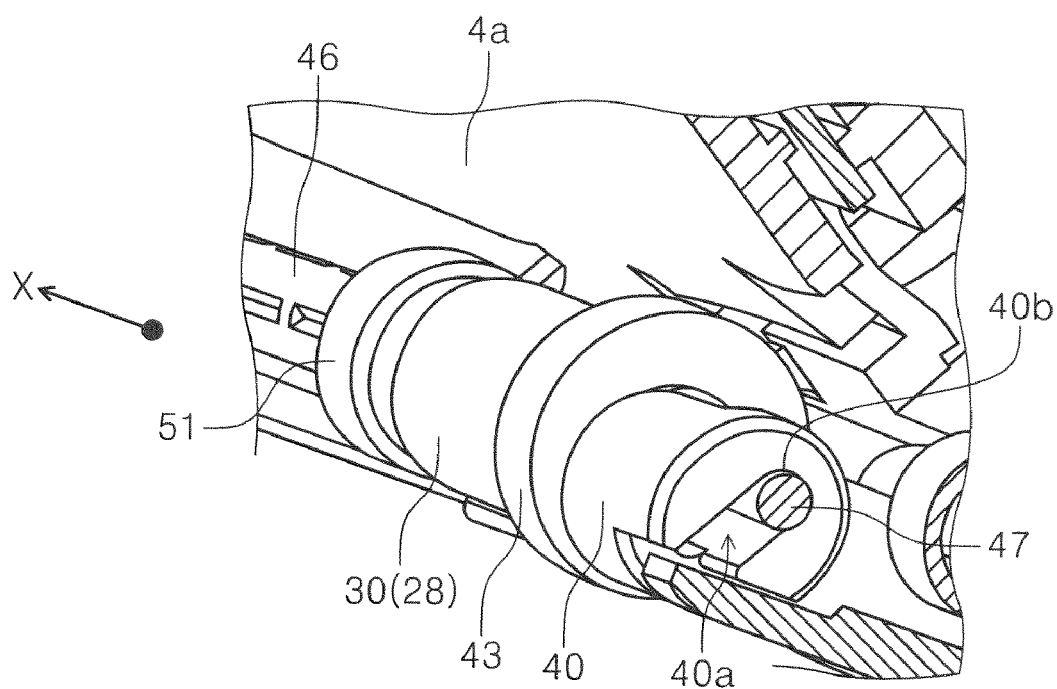
FIG. 7 is a perspective view of a first bearing section.

Symbol 47 is a rotation axis 47 common to the two fourth driven rollers 30 and which is axially supported by the first bearing sections 40. As shown in FIG. 7, the first bearing section 40 has a long groove 40a, and the long groove 40a has a restricting section 40b. The rotation axis 47 contacts the restricting section 40b to restricts displacement in the direction of advancing toward the discharge tray 4a.

That is, the restricting section 40b restricts displacement of the fourth driven roller 30 in the direction of advancing toward the discharge tray 4a. This will have the following effects. If the first discharge aid member 43, which is displaced together with the fourth driven roller 30, contacts the document supported on the discharge tray 4a, the stacked document on the discharge tray 4a may be disturbed. However, since the displacement of the first discharge aid member 43 in the direction of advancing toward the discharge tray 4a is restricted by the restricting section 40b as described above, the first discharge aid member 43 can be prevented from contacting the document supported on the discharge tray 4a and the stacked state of the document on the discharge tray 4a can be properly maintain.

Figure 11:
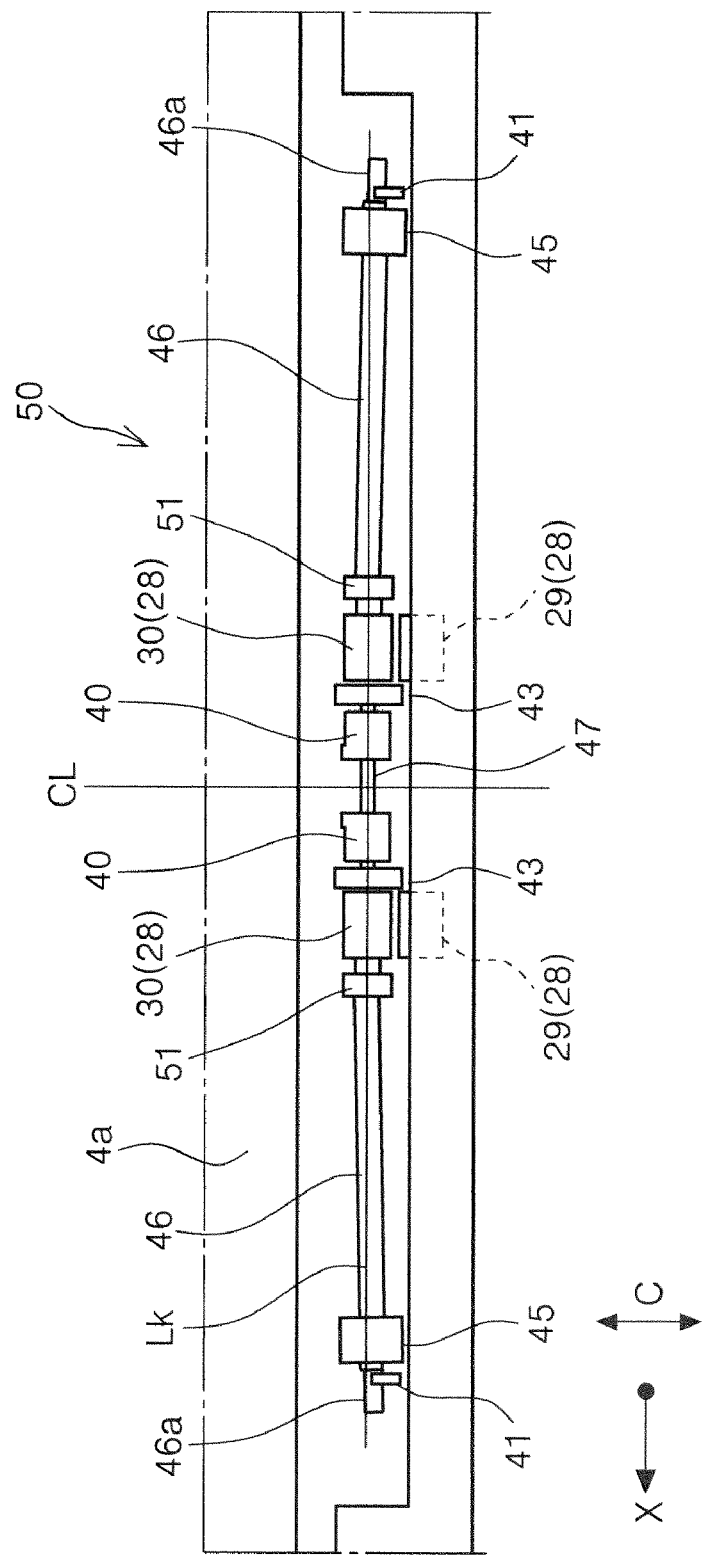
FIG. 11 is a diagram showing a state in which the fourth driven roller and the first discharge aid member are displaced from the state in FIG. 5.

The rotation axis 47 transmits power to the first universal joint 51. The first universal joint 51 is connected to the shaft 46 and is configured to transmit power from the first universal joint 51 to the shaft 46 even if the orientation of the shaft 46 relative to the first universal joint 51 changes. A shaft end portion 46a of the shaft 46 is axially supported by the second bearing section 41. The second bearing section 41 supports the shaft 46 in such a way as to allow the shaft 46 to change orientation. The shaft 46 is provided with a second discharge aid member 45. In this way, the shaft 46 is axially supported by the second bearing section 41, which is located to the outside of the second discharge aid member 45 in the width direction, so that the second discharge aid member 45 can properly maintain its position relative to the document (the position in direction C in FIG. 5) when the fourth driven roller 30 is displaced. In FIG. 5, the line Lk is an axial center line of the rotation axis 47. When the fourth driven roller 30 and the first discharge aid member 43 are displaced in the upward direction in FIG. 5 according to the thickness of the document, the shaft 46 tilts with respect to the line Lk as shown in FIG. 11. This also tilts the second discharge aid member 45, but the position of the second discharge aid member 45 in the C direction is substantially maintained.

Figure 8:
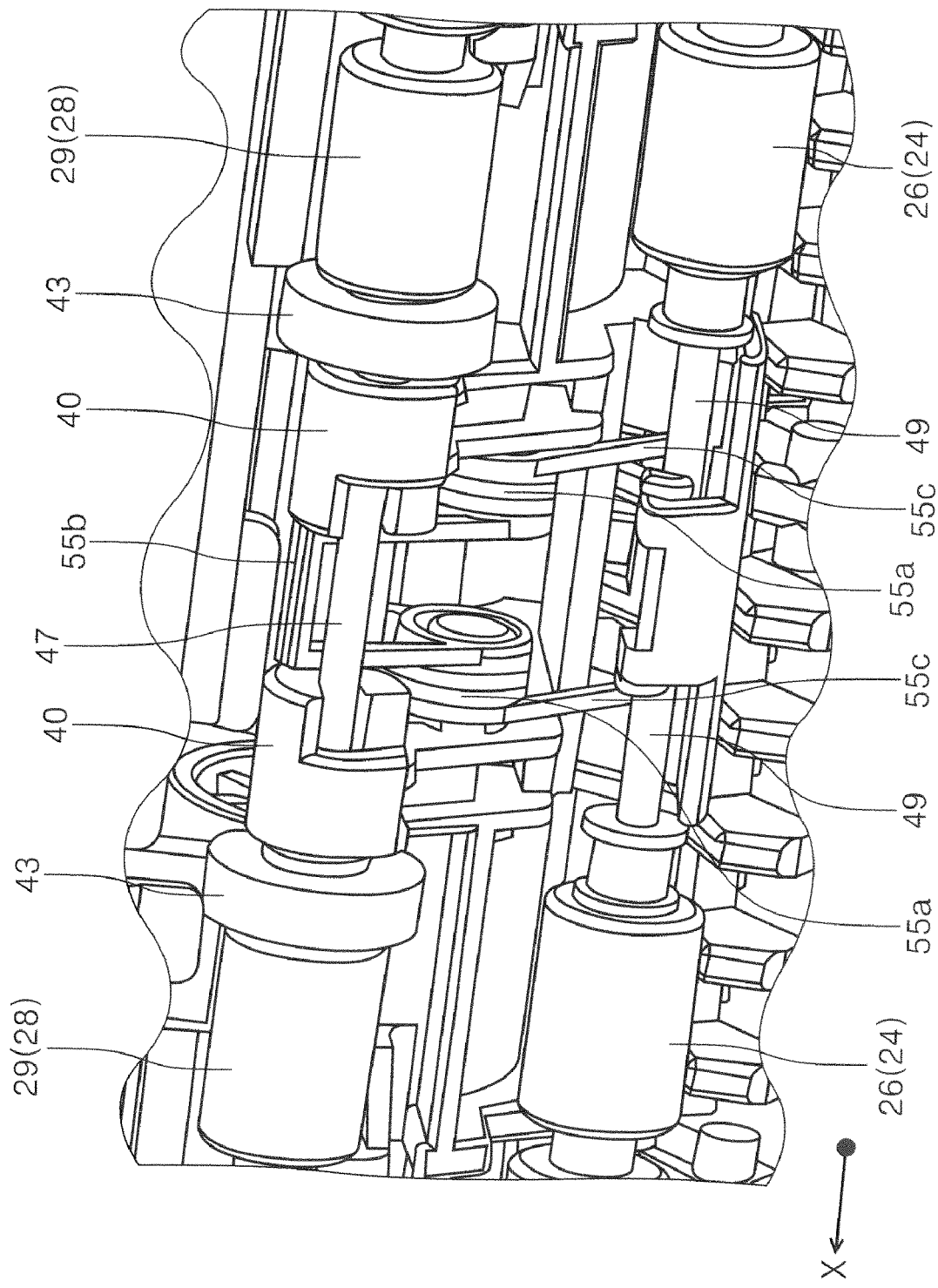
FIG. 8 is a perspective view of a third driven roller, a fourth driven roller, and a double torsion spring.
Figure 9:
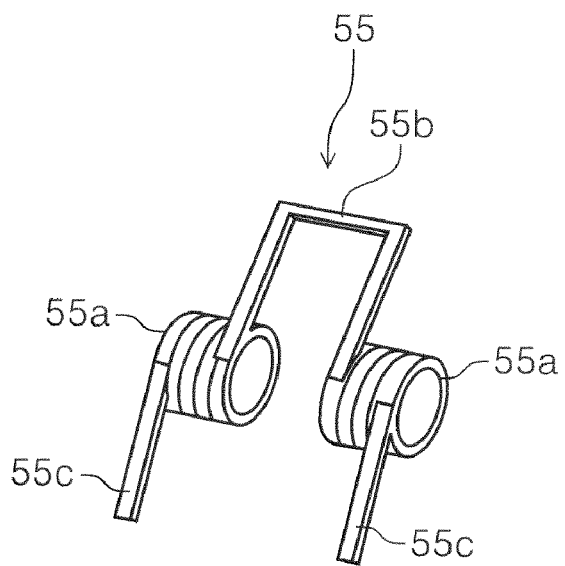
FIG. 9 is a perspective view of the double torsion spring.
Figure 10:
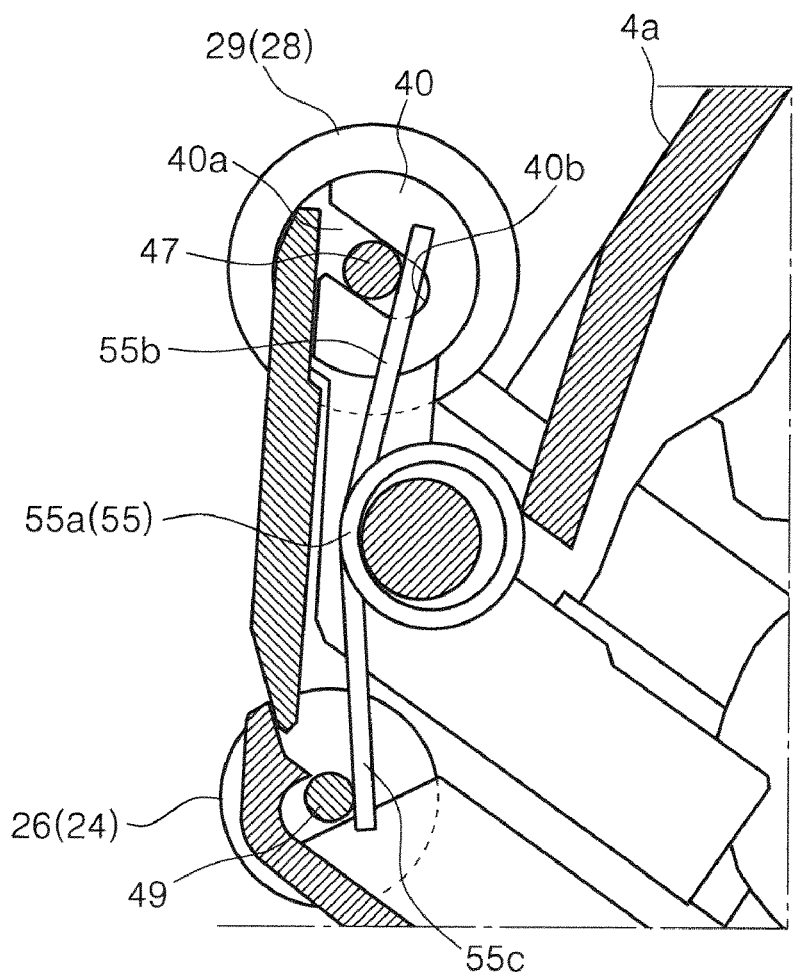
FIG. 10 is a side view of the third driven roller, the fourth driven roller, and the double torsion spring.

The rotation axis 47 is pressed toward the fourth drive roller 29 by a double torsion spring 55 as shown in FIGS. 8, 9, and 10. The double torsion spring 55 has a coil portion 55a, a first arm portion 55b, and a second arm portion 55c. The rotation axis 47 is pressed by the first arm portion 55b. The second arm portion 55c presses the rotation shaft 49 of the third driven roller 26 toward the third drive roller 25. In this way, the fourth driven roller 30 and the third driven roller 26 are pressed against the opposing rollers by the double torsion spring 55, thus it is possible to reduce the number of parts and the number of assembly steps.

Figure 12:
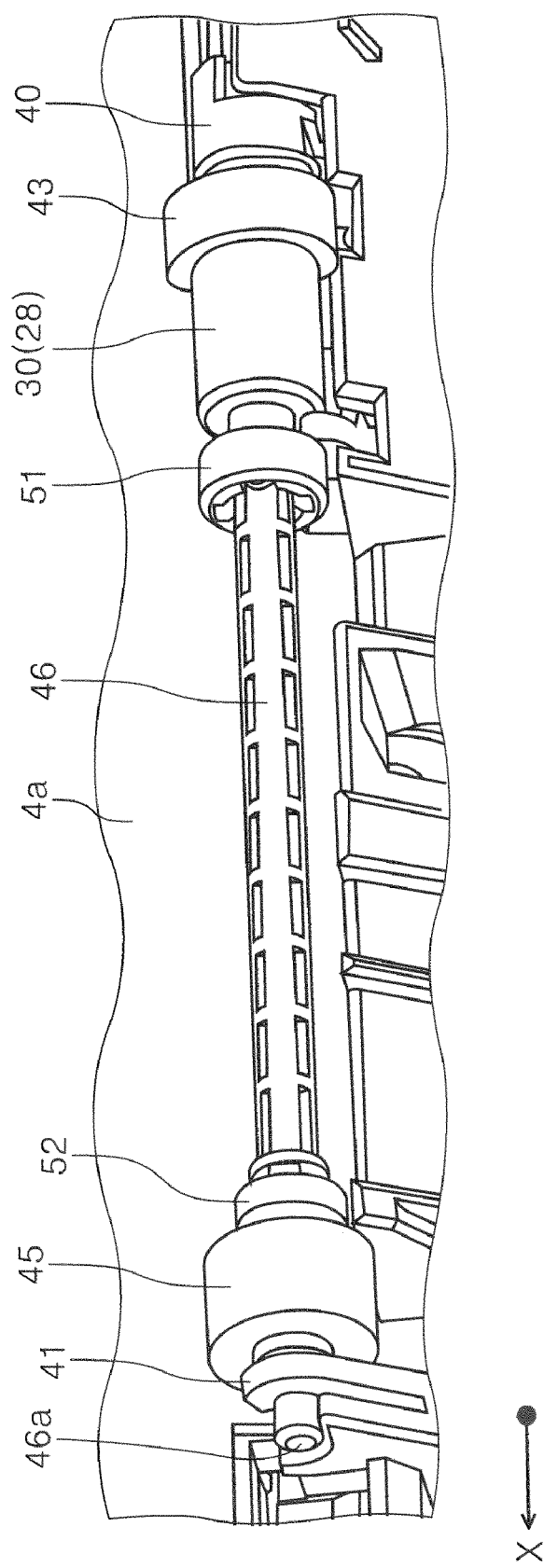
FIG. 12 is a perspective view of the medium discharge device according to another embodiment.

Next, another embodiment will be described with reference to FIG. 12. The difference between this embodiment and the embodiment described with reference FIGS. 5 through 11 is that it provided with a second universal joint 52. That is, in this embodiment, two universal joints, that is, the first universal joint 51 and the second universal joint 52, are provided between the fourth driven roller 30 and the second discharge aid member 45. According to this embodiment, when the fourth driven roller 30 is displaced, the second discharge aid member 45 can be prevented from tilting together with the shaft 46, and its orientation can be maintained in addition to the position with respect to the document. The number of universal joints is not limited to two, and three or more universal joints may be provided.

Figure 13:
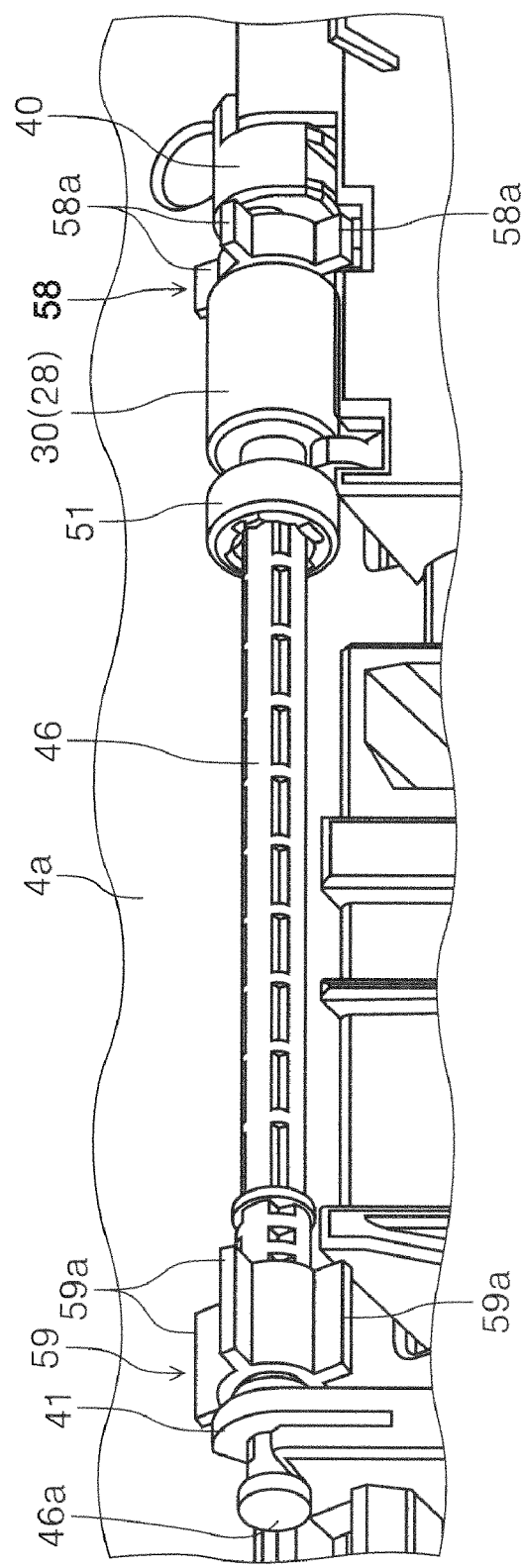
FIG. 13 is a perspective view of the medium discharge device according to still another embodiment.

Next, still another embodiment will be described with reference to FIG. 13. The difference between this embodiment and the embodiment described with reference to FIGS. 5 through 11 is the form of the first and second discharge aid members, which in this embodiment have a first discharge aid member 58 in place of the first discharge aid member 43 described above, and a second discharge aid member 59 in a place of the second discharge aid member 45 described above.

The first discharge aid member 58 has a plurality of equally spaced first protrusions 58a along the circumferential direction, and the second discharge aid member 59 has a plurality of equally spaced second protrusions 59a along the circumferential direction. The first discharge aid member 58 and the second discharge aid member 59 can be made of elastic members of sponge or rubber, or they can be made of resin material. In this manner, the first discharge aid member 58 has a plurality of first protrusions 58a along the circumferential direction, and the second discharge aid member 59 has a plurality of second protrusions 59a along the circumferential direction, so that the kick-out effect can be appropriately applied to the trailing end of the document.

The number of the first protrusions 58a and the second protrusions 59a are the same in this embodiment, but may be different. The phases of the first projections 58a and the second projections 59a coincide in this embodiment, but may be different. In this embodiment, the phase of the first projections 58a on one side of the center line CL (see FIG. 5) in the width direction and the phase of the first projections 58a on the other side are identical. Further, in this embodiment, the phase of the second projections 59a on one side of the center line CL (see FIG. 5) in the width direction and the phase of the second projections 59a on the other side are identical.

The present disclosure is not limited to the embodiments described above, and various modifications are possible within the scope of the disclosure described in the claims, and it goes without saying that such modifications are also included within the scope of the present disclosure. For example, each of the above embodiments describes an example in which the medium discharge device is applied to an image reading device, but it may also be applied to a recording apparatus that records on medium. An example of the recording apparatus is an inkjet printer having a recording head for ejecting ink onto a medium. An example of a recording apparatus can be configured by providing a recording head in place of the second reading section 33 in each of the above embodiments, for example.

What is claimed is:

1. A medium discharge device comprising:
    a discharge drive roller that contacts a first surface of a medium to be discharged and that rotates by power from a drive source;
    a discharge driven roller that contacts a second surface opposite from the first surface of the medium to be discharged and that is drivenly rotated with the medium nipped between itself and the discharge drive roller;
    a first discharge aid member that contacts the second surface of the medium to be discharged, that has a larger diameter than the discharge driven roller, and that rotates by torque from the discharge driven roller; and
    a second discharge aid member that contacts the second surface of the medium to be discharged, that has a larger diameter than the discharge driven roller, and that rotates by torque from the discharge driven roller, wherein
    the second discharge aid member is positioned to the outside of the first discharge aid member in a width direction that intersects a medium discharge direction, the discharge driven roller and the first discharge aid member are displaceable in directions toward and away from the discharge drive roller, and the torque of the discharge driven roller is transmitted to the second discharge aid member via a shaft and a universal joint.

2. The medium discharge device according to claim 1, wherein:

the shaft is supported by a bearing section positioned to the outside of the second discharge aid member in the width direction.

3. The medium discharge device according to claim 2, wherein two universal joints are provided between the discharge driven roller and the second discharge aid member.

4. The medium discharge device according to claim 1, further comprising:

a discharge tray that supports a discharged medium in an inclined orientation, wherein the discharge drive roller and the discharge driven roller are located at a bottom portion of the discharge tray and discharge the medium diagonally upward with the second surface of the medium downward.

5. The medium discharge device according to claim 4, further comprising:

a restricting section that restricts displacement of the discharge driven roller in a direction advancing toward the discharge tray.

6. The medium discharge device according to claim 1, wherein:

the first discharge aid member and the second discharge aid member are configured by an elastic member having a cylindrical shape.

7. The medium discharge device according to claim 1, wherein:

the first discharge aid member has a plurality of first protrusions in a circumferential direction and the second discharge aid member has a plurality of second protrusions in a circumferential direction.

8. The medium discharge device according to claim 1, wherein:

the first discharge aid member and the second discharge aid member are each provided in two positions that are line-symmetry with respect to a center line that passes through a center position of the medium in the width direction and the center line extends along the medium discharge direction.

9. The medium discharge device according to claim 1, further comprising:

a transport drive roller and a transport driven roller that are located upstream of the discharge drive roller and the discharge driven roller and that transport the medium toward the discharge drive roller and the discharge driven roller, wherein the transport driven roller is displaceable toward the transport drive roller, and the discharge driven roller and the transport driven roller are pressed against opposing rollers by a double torsion spring.

10. An image reading device, comprising:

the medium discharge device according to claim 1 and a reading section that is located upstream from the medium discharge device in a medium transport path and that reads the medium.

* * * * *